United States Patent [19]

Locke

[11] Patent Number: 5,588,045
[45] Date of Patent: Dec. 24, 1996

[54] VOICE/DATA TRANSFER METHOD AND APPARATUS UTILIZING AN ALTERNATE LINE

[75] Inventor: Michael E. Locke, Santa Clara, Calif.

[73] Assignee: Siemens Rdm Communications Inc., Santa Clara, Calif.

[21] Appl. No.: 383,031

[22] Filed: Feb. 3, 1995

[51] Int. Cl.$^6$ ............................................... H04M 3/50
[52] U.S. Cl. .............................................................. 379/67
[58] Field of Search ................................. 379/210, 211, 379/212, 156, 165, 241, 310, 232, 233, 214

[56] References Cited

U.S. PATENT DOCUMENTS

| | | | |
|---|---|---|---|
| 3,803,360 | 4/1974 | Morstadt | 379/211 |
| 4,503,290 | 3/1985 | Post et al. | 379/214 |
| 4,640,989 | 2/1987 | Riner | 379/94 |
| 4,685,123 | 8/1987 | Hsia | 379/93 |
| 4,926,462 | 5/1990 | Ladd et al. | 379/214 |
| 4,937,857 | 6/1990 | Yamashita | 379/210 |
| 5,048,073 | 9/1991 | Weiser | 379/63 |
| 5,153,912 | 10/1992 | Sakakibara | 379/100 |
| 5,175,761 | 12/1992 | Khalid | 379/89 |
| 5,325,422 | 6/1994 | Ladd | 379/214 |

Primary Examiner—Krista M. Zele
Assistant Examiner—Thomas F. Presson

[57] ABSTRACT

The reliability of call transfer in a PBX can be improved by verifying the availability of a destination port before a transfer is attempted. The incoming call is routed to an alternate line after the interrogation occurs. Once the availability of the desired facility is confirmed, the call can be picked up by the destination port.

15 Claims, 3 Drawing Sheets

VOICE/DATA TRANSFER METHOD AND APPARATUS UTILIZING AN ALTERNATE LINE

FIELD OF THE INVENTION

This invention relates generally to telephone communications. Specifically, the invention relates to analog telephone subscriber lines having a voice message interface.

BACKGROUND OF THE INVENTION

To enhance telephone service, a telephony applications processor (AP) can be attached to a private branch exchange (PBX) or a central office (CO). One such AP is voice store and forward, or voice mail. Voice mail can use voice message interfacing or enhanced voice message interfacing to determine information identifying the caller and called party.

Occasionally, there may be a need to transfer an incoming call from one AP port to another AP port. For example, assume that the AP has two ports or interfaces. One of the ports (port1) has voice capability only; the other (port2) can provide voice and facsimile (fax) service. If an incoming call initially accesses port1 but requests fax service, it should be transferred to port2. Typically, the transfer is accomplished by flashing the hookswitch on port1, placing the call on hold, initiating a transfer through the PBX with the proper code, answering the call on port2, and then disconnecting port1.

If no other call is attempting to seize port2, the transfer will be achieved. However, with multiple users accessing the AP, occasionally a different caller could seize port2 before the transfer can be made from port1, resulting in a race or glare condition. This places the first caller in an unforeseen hold situation, even though it may have received an indication that the transfer was going through.

In another situation, voice mail units may be distributed across a network. To access one's mailbox, the user must enter on a specific subscriber line or on a specific set of lines. Where there are a limited number of APs distributed over a network, it may be preferable from a management perspective to have users enter the system on a single incoming line. The call must then be transferred to the proper line in order to reach a particular AP.

It would be desirable therefore to obtain confirmation of a port's availability before a transfer is attempted, allowing the call to queue, if need be, for the desired service and have some mechanism of assuring a successful transfer once one is initiated.

SUMMARY OF THE INVENTION

These and other objects are achieved by an apparatus that seizes the desired port (e.g., port2 in the example above) before a transfer is attempted. After port2 is seized (e.g., by going off-hook), assuring its availability, port1 seeks to transfer the call to an internal circuit T1 and thereafter the call is transferred to port2.

BRIEF DESCRIPTION OF THE DRAWINGS

A more complete understanding of the present invention, as well as other objects and advantages thereof not enumerated herein, will become apparent upon consideration of the following detailed description and the accompanying drawings, wherein.

DETAILED DESCRIPTION OF THE INVENTION

Figure 1:
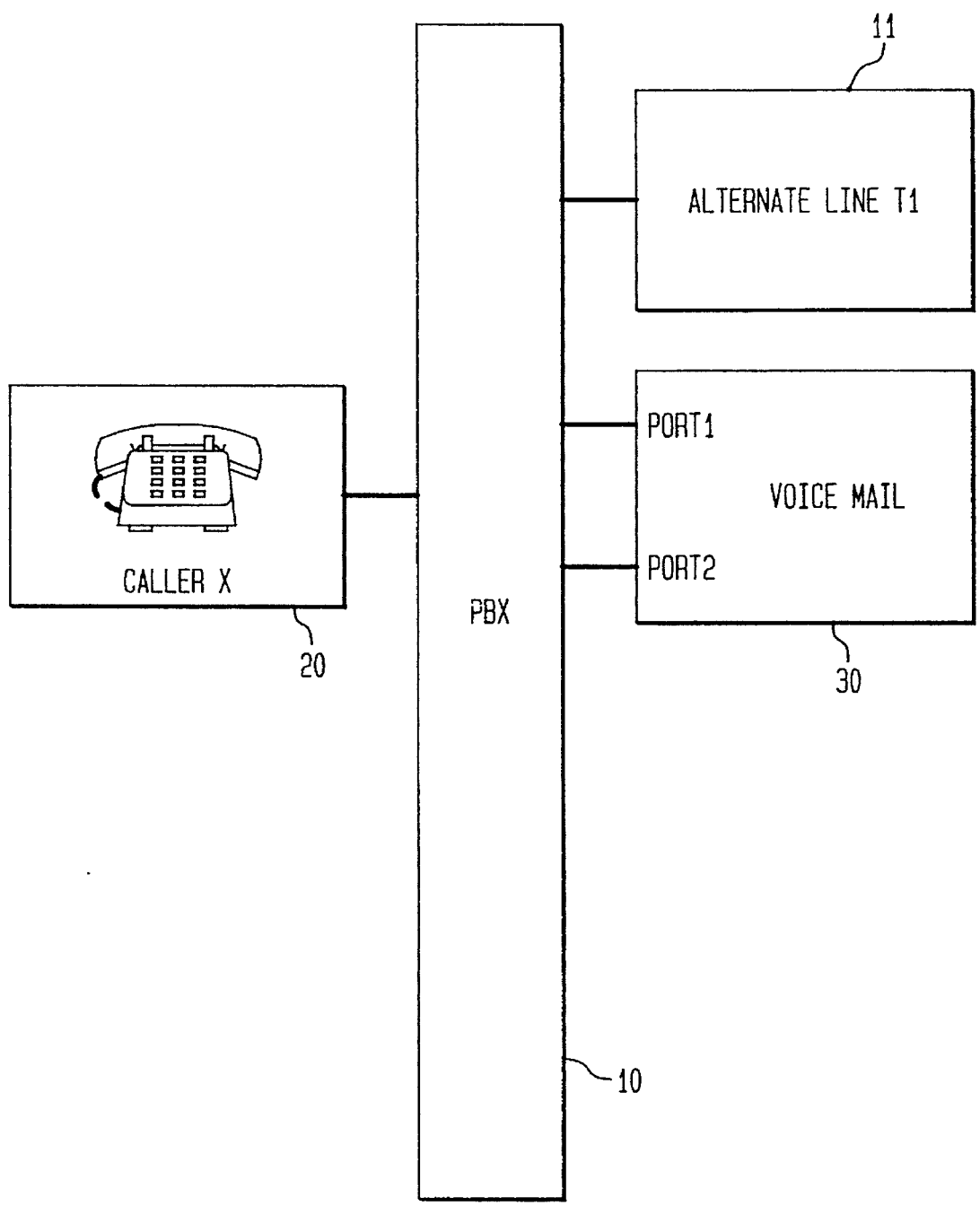
FIG. 1 is a schematic block diagram of a PBX having with an incoming line, an applications processor, and an alternate line.

FIG. 1 shows a PBX 10 having an incoming line (caller X) 20, an applications processor shown here as a voice mail system 30, and an internal dummy or alternate line T111. The voice mail system 30 has two ports, port 1 and port2. It should be understood that port1 and port2 can directly communicate with each other as they are contained within the system.

Control of the functions discussed here and performed by the PBX 10 is provided by the voice mail system 30. Although the applications processor is shown as a voice mail system 30, it should be understood that some other module, circuit, or facility could serve the same function. To properly handle calls coming into the PBX 10, the PBX 10 must be able to route the calls to the appropriate destination, without causing race or glare within the system.

Figure 2:
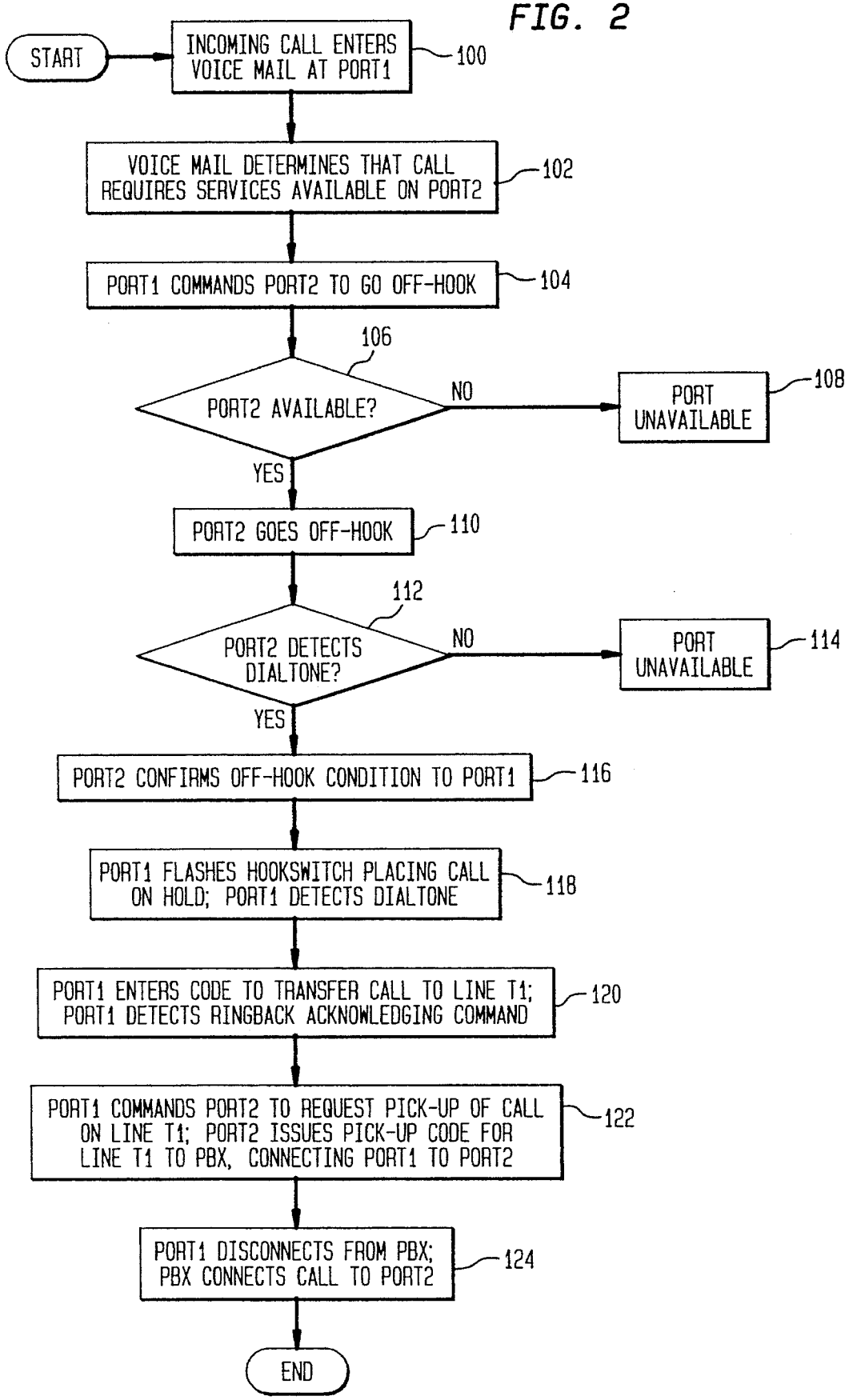
FIGS. 2 and 3 are flow charts of the operation of the telephone call transfer application.

Initially, as shown in the flow chart in FIG. 2, an incoming call from a caller 20 is received on port1 of voice mail 30 (100). (The numbers in parentheses refer to the blocks in the flow chart.) The voice mail 30 determines that the caller 20, demanding fax services, needs to access port2, which offers fax capability (102). To execute a transfer without losing the caller 20, port1 directs port2 to go off-hook (104), thus seizing port2. If port2 is not otherwise occupied (106), port2 goes off-hook, detects dialtone (112), and then signals port1 that it has gone off-hook (116). If port2 is occupied, then it will indicate that it is unavailable (108). By going off-hook, port2 avoids being captured by some other call or command before the transfer can be completed.

Also, if port2 was available but another call was previously routed to port2, dialtone will not be detected (112) and again the port is unavailable (114). Port1 will then tell the caller 20 that port2 is busy and suggest that the caller 20 go on hold or call back at another time. If the system has other suitable ports, port1 could address another port and attempt to seize it.

Once the seizure of port2 is completed, port1 flashes the hookswitch (not shown), placing the caller 20 on hold; port1 then will detect dialtone (118). Port1 then enters a code to transfer the caller 20 on port1 to alternate line T1 (120). This line is not accessible from outside of the PBX 10. Port1 detects a ringback signal signalling that the call is now ringing alternate line T1 (120). It should be understood that T1 is a dummy line that cannot be answered; rather, it will keep ringing until port1 terminates the transfer call or some other action is taken.

Alternate line T1 is employed because the PBX 10 will not permit the direct transfer of the caller 20 from port1 to port2, since port2 is off-hook and presumably unavailable. However, port2 can pick up the call from alternate line T1 by signalling the PBX 10 that it wants to pick up the call tinging line T1. In order to achieve this, alternate line T1 must be configured on the PBX 10 to allow this sequence.

Port1 then sends a command to port2 requesting pick-up of the call on T1 (122). Port2 will issue a pickup code for alternate line T1, causing the PBX 10 to connect port1 and port2 (122). Port1 then disconnects from the PBX 10, causing the PBX 10 to connect port2 and the caller 20 (124).

Before disconnecting, the AP or voice mail system 30 can test that a connection has been made between the port1 and port2 to guarantee the integrity of the system, using techniques known to those skilled in the art.

This method of transferring a call from one port of an applications processor to another can be used in a variety of situations. The first, mentioned above, concerns the transfer to provide fax service. The same technique can be used to route a caller to the proper voice mail module irrespective of the port on which the caller entered for voice mail retrieval. It can also be used to assist a caller seeking outgoing (fax-on-demand service).

It should be understood that the functions performed here could be initiated by instructions distributed over the applications processor and the switch or resident solely in the applications processor or the switch. Alternatively, these instructions could be located elsewhere. Further, the instructions may be encoded in ROM or RAM, placed in firmware, or held in some other device.

Figure 3:
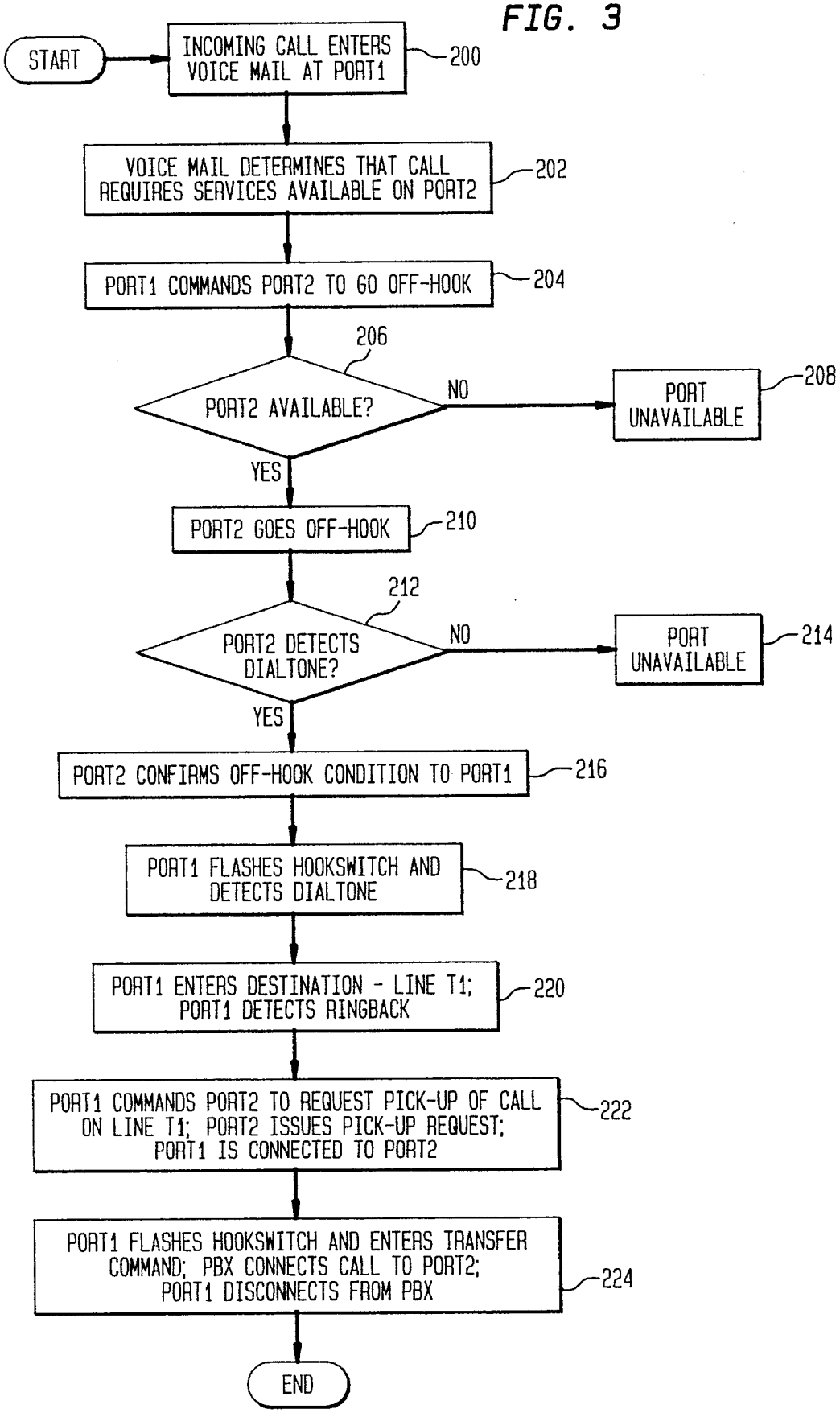

It should also be recognized that the specific sequence of operations to achieve a call transfer and other functions may vary with the equipment employed. Thus, for example, many switches achieve a transfer by flashing the hookswitch, entering a transfer command and then the destination. After the connection is made, the transferring station then disconnects. In some other switches, a transfer is achieved by flashing the hookswitch, entering the destination, flashing the hookswitch again, and then entering a transfer command. This alternate sequence is reflected in the flow chart of FIG. 3, specifically in steps 218 through 222.

While there has been described what is believed to be the preferred embodiment of the invention, those skilled in the art will recognize that other and further modifications may be made thereto without departing from the spirit of the invention, and it is intended to claim all such embodiments that fall within the true scope of the invention. For example, although the examples discussed centered around a PBX, this technology is equally applicable to a central office. Additionally, although the phrase "off-hook" has been used here, it should be understood that this invention is applicable to both analog and digital telephone systems.

What is claimed is:

1. An apparatus for transferring a call from a first port of an applications processor for a telephone switch having an internal alternate line to a second port of the applications processor, comprising:

means for seizing the second port;

means for detecting dialtone at the second port;

means for confirming the detection of dialtone to the first port;

means for initiating a transfer of the call to the alternate line; and means for transferring the call to the second port, wherein said alternate line is configured such that said alternate line will not go off-hook prior to said call being connected to said second port.

2. An apparatus as set forth in claim 1, wherein the means for initiating a transfer of the call to the alternate line includes:

means for placing the call on hold;

means for generating a signal that causes the telephone switch to transfer the call to the alternate line; and means for detecting ringback at the first port.

3. An apparatus as set forth in claim 2, wherein the means for placing the call on hold includes:

means for flashing a hookswitch at the first port; and means for detecting dialtone at the first port.

4. An apparatus as set forth in claim 1, wherein the means for transferring the call to the second port includes:

means for generating a signal to said telephone switch, said signal causing said second port to pick up the call on the alternate line;

means for connecting the first and second ports;

means for releasing the first port; and means for connecting the call to the second port.

5. An apparatus as set forth in claim 1, wherein the means for initiating a transfer of the call to the alternate line includes:

means for flashing a hookswitch at the first port;

means for specifying a destination to use in transferring the call on said first port; and means for detecting ringback at the first port.

6. An apparatus as set forth in claim 1, wherein the means for transferring the call to the second port includes:

means for generating a signal to the telephone switch, said signal causing a pick-up of the alternate line;

means for connecting the first and second ports;

means for flashing a hookswitch at the first port;

means for causing the telephone switch to transfer said call on said alternate line to the second port; and means for releasing the first port.

7. A method for transferring a call from a first port of an applications processor for a telephone switch having an internal alternate line to a second port of the applications processor, comprising the steps of:

seizing the second port;

detecting dialtone at the second port;

confirming the detection of dialtone to the first port;

initiating a transfer of the call to the alternate line; and transferring the call to the second port, wherein said alternate line is configured such that said alternate line will not go off-hook prior to said call being connected to said second port.

8. A method as set forth in claim 7, wherein the step of initiating a transfer of the call to the alternate line further includes the steps of:

placing the call on hold;

causing the transfer of the call to the alternate line; and detecting ringback at the first port.

9. A method as set forth in claim 8, wherein the step of placing the call on hold includes the steps of:

flashing a hookswitch at the first port; and detecting dialtone at the first port.

10. A method as set forth in claim 7, wherein the step of transferring the call to the second port includes the steps of:

causing said second port to pick-up the alternate line;

connecting the first and second ports;

releasing the first port; and connecting the call to the second port.

11. A method as set forth in claim 7, wherein the step of initiating a transfer of the call to the alternate line further includes the steps of:

flashing a hookswitch at the first port;

specifying a destination for the transfer of the call connected to the first port; and detecting ringback at the first port.

12. A method as set forth in claim 7, wherein the step of transferring the call to the second port includes the steps of:

causing said second port to pick-up the alternate line;
connecting the first and second ports;
flashing a hookswitch at the first port;
causing a transfer;
connecting the call to the second port; and
releasing the first port.

13. A method for transferring a call from a first port of a voice mail system for a telephone switch having an internal alternate line to a second port of the voice mail system, comprising the steps of:

causing a seizure of the second port;
    detecting dialtone at the second port;
    confirming the detection of dialtone to the first port;
    flashing a hookswitch at the first port;
    detecting dialtone at the first port;
    causing the transfer of the call to the alternate line;
    detecting ringback at the first port;
    causing the second port to pick-up the alternate line;
    connecting the first and second ports;
    releasing the first port; and
    connecting the call to the second port, wherein said alternate line is configured such that said alternate line will not go off-hook prior to said call being connected to said second port.

14. An apparatus for transferring a call from a first port of an applications processor for a telephone switch having an internal alternate line to a second port of the applications processor, comprising:

means for seizing the second port;
    means for detecting dialtone at the second port;
    means for confirming the detection of dialtone to the first port;
    means for initiating a transfer of the call to the alternate line; and
    means for transferring the call to the second port,
    wherein said means for seizing is configured so as to seize said second port prior to said call being connected to said second port.

15. A method for transferring a call from a first port of an applications processor for a telephone switch having an internal alternate line to a second port of the applications processor, comprising the steps of:

seizing the second port;
    detecting dialtone at the second port;
    confirming the detection of dialtone to the first port;
    initiating a transfer of the call to the alternate line; and
    transferring the call to the second port,
    wherein said seizing step occurs prior to said initiating step.

* * * * *